Dec. 5, 1961 W. HEIMANN ET AL 3,012,149

PICTURE AMPLIFYING STORAGE SYSTEM

Filed Nov. 4, 1959

INVENTORS:
WALTER HEIMANN
KARL GOTTFRIED
BY Leon M. Strauss
AGT.

3,012,149
Patented Dec. 5, 1961

3,012,149

PICTURE AMPLIFYING STORAGE SYSTEM

Walter Heimann and Karl Gottfried, Wiesbaden, Germany, assignors to Forschungslaboratorium Prof. Dr. Ing. Walter Heimann, Wiesbaden-Dotzheim, Germany, a German firm Filed Nov. 4, 1959, Ser. No. 850,881
Claims priority, application Germany Nov. 5, 1958
4 Claims. (Cl. 250—213)

The present invention relates to a picture amplifier and storage tube for television receivers, or the like.

There has already been suggested in the prior art a video converter device for video pulses in picture form or for video signals of very low luminosity where a video potential is provided on a storage grid by a photocathode, or by any other electron-emitting means, by electron-optical reproduction. This video potential, in turn, excites a luminescent screen or signal plate by means of a second electron stream produced by emitter means. Essentially, said converter tube provides for a combination of the following features:

(*a*) The video or picture storage grid has a very fine mesh and comprises a metal core provided with an insulating layer for secondary electron emission.

(*b*) The secondary emission means comprises a grid whose wire meshes are wider by at least the factor two than the video storage grid. A photolayer which is sensitive preferably to blue or ultraviolet light is provided on one side of the secondary emitter grid.

(*c*) The emitter grid is so disposed between the electron emitting photocathode of the tube or device and the video storage grid that the photolayer, which is excited by constant light radiation externally of the device, faces the storage grid and the fine-mesh storage grid is sharply reproduced on a luminescent screen or signal plate so that the wide-mesh emitter grid consequently is blurred. With the described converter tube it was possible to make short video pulses, whether in the form of picture pulses or to obtain a predetermined luminous distribution visible at any time or, at the same time, to store video picture signals of very low luminosity.

It is an object of the present invention to provide means affording a considerable simplification in the described type of converter tube, the simplified tube nevertheless achieving results as heretofore contemplated but not so desirably attained by prior art tubes.

It is another object of the present invention to provide means facilitating the use of the photocathode both as an electron source for storing and recording the video or picture signals and for their subsequent read-out.

It is a further object of the present invention to provide means ensuring the collection, during the recording operation, of all secondary electrons emitted from the storage grid.

These and other objects of the invention will become further apparent from the detailed description, reference being made to the accompanying drawings, showing preferred embodiments of the invention.

In the drawings which illustrate the best modes presently contemplated for carrying out the invention:

Pursuant to the present invention provision is made for a picture amplifier and storage tube having a photoelectric cathode which is used as a source of electrons for storing and recording the picture signals as well as for subsequent read-out thereof, the picture being projected onto the photoelectric cathode by means of a lens system, the photoelectric cathode being illuminated by diffused light radiating from suitably arranged light sources. Between the photoelectric cathode and the storage grid, and adjacent the accelerating electrode, there is arranged an additional electrode. The potential of the additional electrode can be variably adjusted in such a manner that, during the recording operation, it collects all secondary emission from the storage grid. That is, during the recording operation, the additional electrode has a high positive bias relative to the storage electrode or grid.

During erasure and pulse scaning of the stored signals, the aditional electrode repels all secondary electron emission from the storage grid back thereto. For this purpose, the additional electrode is biased slightly negative, for example by ten volts, relative to the storage grid. During the read-out process, the electrons emitted from the photoelectric cathode are imparted such a high velocity, in addition to the potentials of the accelerator electrode and/or storage electrode that they can not impinge upon the storage grid but pass therethrough. Accelerator electrodes are preferably disposed between the storage grid and the screen of the tube. Such a voltage is applied to the accelerator electrodes that the electrons which pass through the storage grid impinge upon the screen. The accelerator electrodes are coarse meshed grids and the distance between the picture screen and storage grid is so small that no additional electron lenses are necessary to reproduce the picture on the screen. The additional electrode is preftrably in the form of a ring having an effective diameter which is equal to or slightly less than the diameter of the storage grid and is mounted between the accelerator grid and the storage grid.

Figure 1:
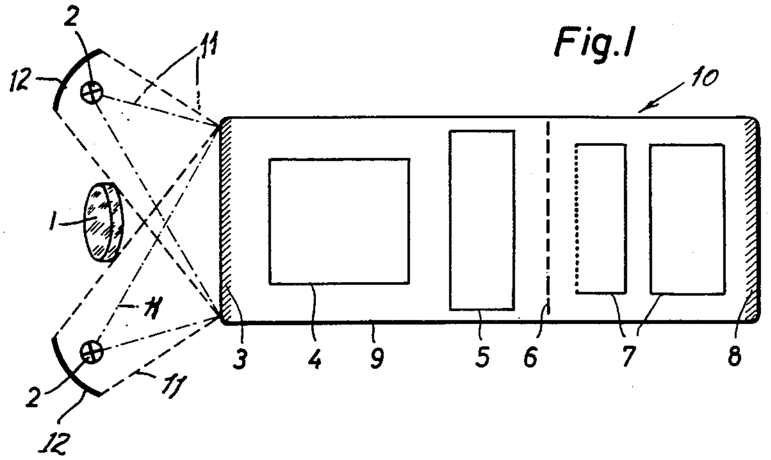
FIG. 1 is a more or less schematic representation of a video amplifier and storage tube pursuant to the present invention.

Referring now to FIG. 1 in detail, there is shown a picture amplifier and storage tube 10 pursuant to the present invention. The tube 10 has a highly evacuated preferably glass envelope 9. The envelope 9 is provided, at one end thereof, with a large-surface, homogeneous and transparent photoelectric cathode 3. The picture image which is to be reproduced is projected by means of an optical lens system 1 onto the surface of the photoelectric cathode. An accelerator grid or electrode 4 is mounted behind the photoelectric cathode. Means are utilized to bias the grid 4 several hundred volts positive relative to the photocathode to accelerate the electrons emitted from the latter in response to the image projected thereon. Pursuant to an important feature an additional electrode 5 is positioned behind the grid 4. Substantially the same positive bias is applied to grid 5, as is applied to grid 4. A relatively fine mesh storage grid or electrode 6 is disposed behind the additional electrode 5. The electrons emitted by photocathode 3, in response to image projection thereon, are reproduced on storage electrode 6 by means of a conventional electro-optical lens means (not illustrated) which can be either of the electromagnetic or electrostatic type, or a combination of both types.

The storage grid 6 is biased several hundred volts positive relative to the cathode 3. The electrons emitted by the cathode and impinging upon the storage grid provide a secondary emission of electrodes from the storage grid which move away therefrom. The surface of grid 6 is covered with a special insulating material, for example magnesium fluoride, and is rendered more positive after the secondary electron emission therefrom, especially when electrode 5 is positively biased relative to electrode 6. Before the tube 6 is utilized to store an image, diffused light rays 11 are directed on cathode 3 from the light sources 2 and reflectors 12, the potential applied to electrode 5 is variable, and when the diffused light rays are directed onto the cathode 3, the information or image representation stored on grid 6 is erased. This is achieved by applying a scanning pulse to electrode 5 so that it is negatively biased by about 10 volts relative to the storage grid 6. Consequently, electrons emitted by secondary emission from grid 6 are repelled thereto and charge the surface thereof uniformly negative. For a subsequent storage operation, the potential on the electrode 5 is increased to its original positive potential, the above-mentioned bias exists between the electrode 5 and storage grid 6, and the secondary electrons released during the storage process can be completely collected by electrode 5. A relief potential is then formed on the storage electrode during the storage period.

The reading process and the reproduction of the stored picture follow. For this purpose the cathode 3 is slightly pre-exposed by diffused light. The electrons emitted therefrom are accelerated and impinge uniformly over the entire surface of grid 6. The potentials present on the grids 4, 5, and 6 impart such a high velocity that the electrons can not impinge on the storage grid but pass through the open mesh of the latter. Additional acceleration electrodes 7 are positioned behind the storage grid, and by a high positive potential applied thereto, the electrons travel at a high velocity toward the screen 8. Focussing is effected in conventional manner either magnetically or electrostatically, so that a reproduction of the image stored on the grid 6 is effected on the luminescent screen 8. The local charge distribution on grid 6 effects a local control of the diffused electron beam and thus produces a picture on screen 8 of the charge distribution on grid 6.

Accelerator grid 7 is of a substantially coarse mesh. Accelerator grid 5 is annular in conformation and has an effective diameter substantially equal to or slightly less than the diameter of grid 6.

Figure 2:
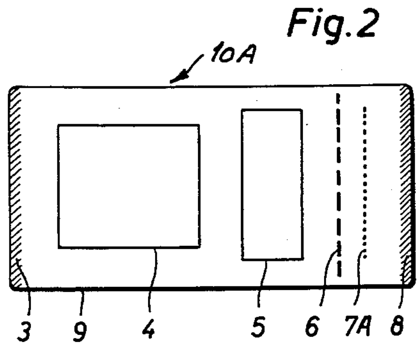
FIG. 2 is a view similar to FIG. 1 and illustrates another embodiment of the invention.

Referring now to FIG. 2 in detail, there is shown a tube 10A wherein elements similar to those in tube 10 are indicated by the same reference numerals. In the present embodiment, the electron-optical system mounted behind storage grid 6 of FIG. 1 is eliminated. The screen 8 is arranged close to accelerator grid 7A which is in the form of a coarse-mesh member rather than in the tubular two element electron-optical form shown in FIG. 1.

Various changes and modifications may be made without departing from the spirit and scope of the present invention and it is intended that these modifications and changes be embraced by the annexed claims.

Having thus described the invention, what is claimed as new and desired to be secured by Letters Patent is:

1. A picture amplifying storage system comprising a tube having a photoelectric transparent cathode at one end of the tube, a luminescent screen at the other end of said tube, a fine mesh storage grid disposed between the cathode and screen, said grid having an insulating surface for secondary emission of electrons, electron lens means for reproducing the cathode image electro-optically on the storage grid and the reproduced image on the screen, a lens system for projecting a picture onto the cathode, means to illuminate the cathode with diffused light rays, an accelerator grid mounted between the cathode and the storage grid, an additional grid mounted between the accelerator grid and storage grid, and means to vary the potential applied to said additional grid so that it attracts secondary emission electrons from the storage grid during recording of the picture thereon, repels said secondary emission electrons during erasure of the stored image, and accelerates electrons from said cathode during reading.

2. A picture system, as set forth in claim 1, including additional accelerator electrodes disposed between the storage grid and the screen.

3. A picture system, as set forth in claim 1, including additional accelerator electrodes disposed between the storage grid and the screen, said last mentioned accelerator electrodes having a coarse mesh and being located adjacent the screen, whereby to obviate the need of additional electronic lenses for reproduction of the picture on the screen.

4. A picture system, as set forth in claim 1, said additional grid being annular in conformation and having an effective diameter substantially equal to the diameter of the storage grid.

References Cited in the file of this patent

UNITED STATES PATENTS

| | | |
|---|---|---|
| 2,699,511 | Sheldon | Jan. 11, 1955 |
| 2,903,596 | Reed | Sept. 8, 1959 |